C. H. HENZEL.
HEATER.
APPLICATION FILED FEB. 13, 1909.
931,422.
Patented Aug. 17, 1909.
2 SHEETS—SHEET 2.
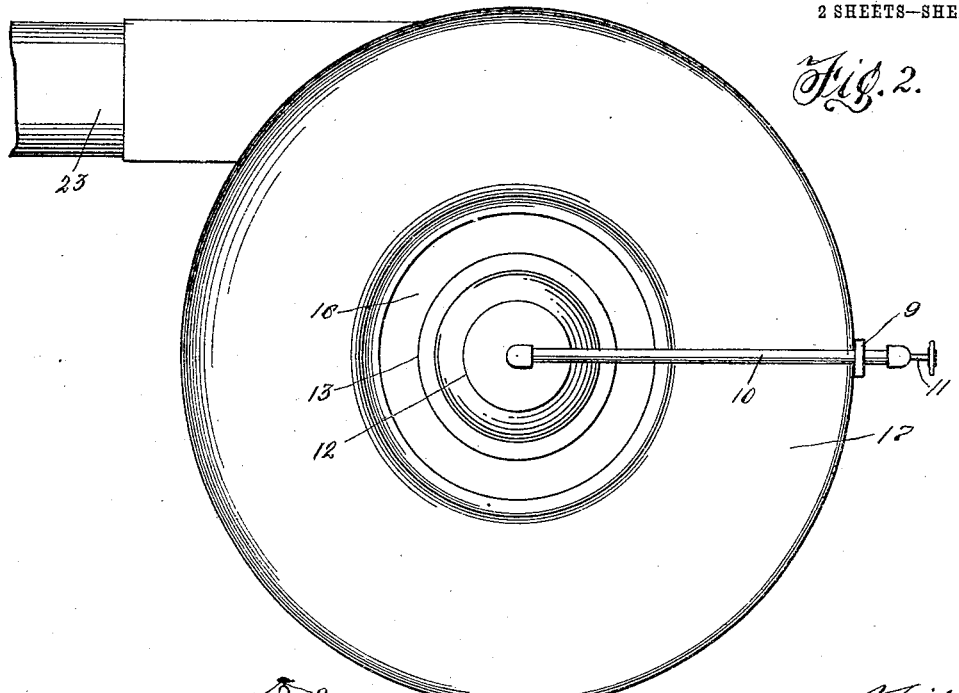
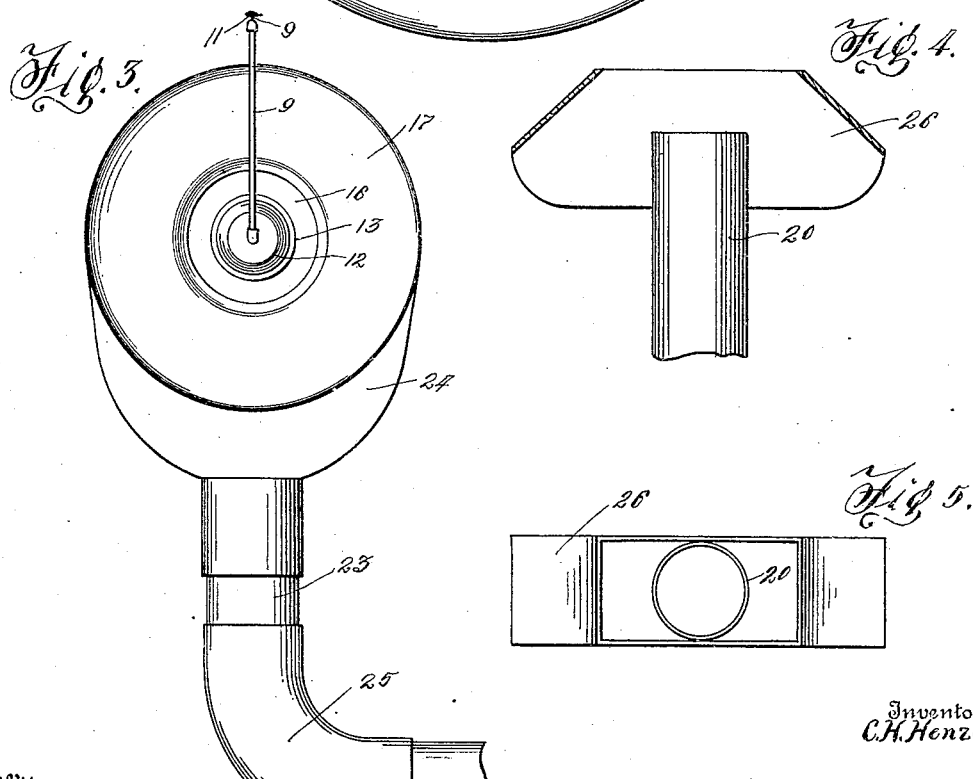
Witnesses
Samuel Payne
R. H. Buller
Inventor
C. H. Henzel
By H. Evertt
Attorneys

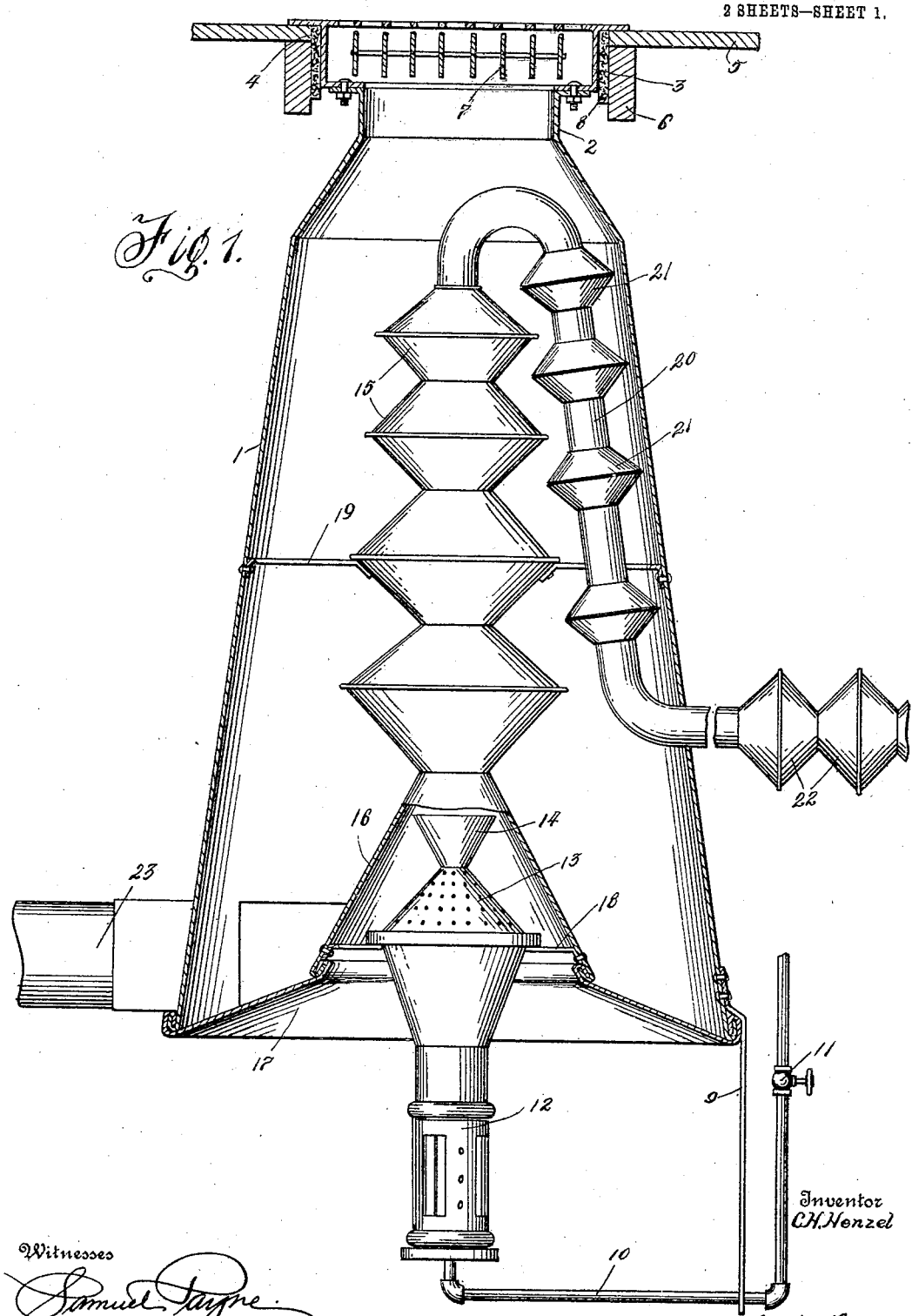

UNITED STATES PATENT OFFICE.

CASPER H. HENZEL, OF PITTSBURG, PENNSYLVANIA.

HEATER.

No. 931,422.  Specification of Letters Patent.  Patented Aug. 17, 1909.

Application filed February 13, 1909. Serial No. 477,596.

*To all whom it may concern:*

Be it known that I, CASPER H. HENZEL, a citizen of the United States of America, residing at Pittsburg, in the county of Allegheny and State of Pennsylvania, have invented certain new and useful Improvements in Heaters, of which the following is a specification, reference being had therein to the accompanying drawing.

This invention relates to heaters, and more particularly to that type of heater commonly styled a "hall heater", and generally located in the cellar and suspended from the first floor for admitting heat to the hall of a building, whereby the heat within the hall can spread throughout the building and thoroughly heat the same.

The primary object of the invention is to provide a novel heater wherein gas is used for heating cold air admitted to the heater from the exterior of the building, prior to the air passing into the hall.

Another object of this invention is the provision of novel means in connection with a heater of the above type for excluding cellar air from that portion of the heater that communicates with the hall.

A further object of this invention is to provide the exhaust pipe of the heater with a plurality of baffle casings for increasing the efficiency of the heater and preventing back-drafts in the pipe or from chimneys or stacks into which the pipe extends.

I attain the above objects by a heater which is an improvement upon my Patents No. 854,497, granted May 21, 1907, and No. 897,207, granted August 25, 1908, the present improvement residing in first, providing the exhaust pipe with additional baffle-casings; second, excluding cellar air from the heater; and third, providing a cold air inlet to the heater that will permit of fresh air being heated and delivered to a hall. Of these three mentioned improvements, the additional baffle-casings are most important, and the efficiency of the heater is not only increased, as to the number of calories delivered, but back-drafts are prevented which have been known to extinguish the heat generating flame of the heater.

The invention will be hereinafter more fully described, and reference will now be had to the drawings, wherein there is illustrated the preferred embodiments of the invention, but it is to be understood that the structural elements therein can be varied or changed according to the spirit and scope of the invention.

In the drawings, Figure 1 is a vertical sectional view of a heater constructed in accordance with my invention, Fig. 2 is a bottom plan of the same, Fig. 3 is a similar view of the same upon a smaller scale, illustrating a modified form of cold air inlet, Fig. 4 is a longitudinal sectional view of a wind shield designed for use in connection with the heater, and Fig. 5 is a plan of the same.

The reference numeral 1 designates a frusto-cone-shaped shell having a contracted upper end 2 suspended from a box-like structure 3, suitably secured in an opening 4 formed in a floor 5 between the joists 6. The box-like structure 3 contains a convenient form of register 7, and to protect the wood work surrounding the box-like structure 3, asbestos 8 or similar material is used.

9 designates a hanger secured to the lower edges of the shell 1, said hanger supporting a gas supply pipe 10 having the controlling valve 11, an air mixer 12, and a perforated burner 13 provided with a deflector 14. All of these elements are shown in my Patent No. 897,207, and have been simply recited to identify my improvement with the same.

The first improvement resides in arranging within the shell 1 two sets of baffle casings, and in the exterior of the casing additional baffle casings adapted to prevent a back-draft entering the shell 1. The baffle-casings within the shell are compactly arranged and are of a construction that will provide a large area to be heated before the final exhaust of the heat units.

15 designates a plurality of superimposed communicating double frusto-cone-shaped casings, said casings gradually decreasing in size from the lower most casing to the upper most. The lower most casing 15 is supported by a cone-shaped dome 16, carried by an annular closure 17 for the lower end of the shell 1, said closure having the edges thereof connected to the shell 1 and the dome 16 by ordinary lapped or reamed connections. Within the dome 16 is located a bracket 18 to assist the hanger 9 in supporting the burner 13.

Within the shell 1 are arranged brackets 19 adapted to engage one of the intermediate casings 15 and assist the closure 17 in supporting said casings.

Connecting with the uppermost baffle casing 15 is an exhaust pipe 20, said pipe extending downwardly in the shell 1, and protruding through said shell in proximity to the lower edges thereof. Arranged upon the pipe 20 within the shell 1 is a plurality of baffle-casings 21, said casings communicating with the pipe, and are staggered with relation to the casing 15 to economize the space within the shell 1.

Located upon the pipe 20 outside of the shell 1 are baffle-casings 22, and these casings besides heating the air within the cellar to a certain degree, these baffle casings are especially designed for retarding a back-draft in the exhaust pipe 20.

Communicating with the shell 1 and disposed tangentially thereto, is a cold air inlet pipe 23 adapted to admit cold air to the shell 1, whereby the air can pass upwardly within the shell and contact with the exterior heated surfaces of the two sets of baffle-casings 15 and 21.

Instead of arranging the cold air inlet pipe 23 tangentially relative to the shell 1, I can provide the shell with a spreader head 24 for disseminating the air admitted to the shell from the cold air pipe 23. In connection with this pipe an elbow 25 can be used, whereby suitable connections can be made for receiving cold air from the exterior of the building.

In Figs. 4 and 5 of the drawings, another improvement is shown, wherein the outer end of the exhaust pipe 20 is provided with a wind shield 26 adapted to prevent a down-draft in said pipe.

It will be observed that before the heated units are allowed to finally escape, that said units are conveyed through numerous baffle-casings, whereby said heated units will thoroughly heat the casing and prevent cold air from escaping through the shell 1 into a hall without being heated.

Having now described my invention what I claim as new, is:—

1. A heater comprising a frusto cone-shaped shell, a closure for the lower end of the shell, a burner extending through said closure, a dome supported by the closure, surrounding said burner and arranged within the shell, a plurality of superimposed communicating double frusto conical shaped baffle casings arranged upon said dome and gradually decreasing in size upwardly, an exhaust pipe communicating with the uppermost casing and extending downwardly in said shell, a plurality of double frusto conical shaped baffle casings interposed in said pipe, spaced from each other and arranged within the shell and a plurality of communicating double frusto conical shaped baffle casings connected to said pipe exteriorly of said shell.

2. A heater comprising a frusto cone-shaped shell, a closure for the lower end of the shell, a burner extending through said closure, a dome supported by the closure, surrounding said burner and arranged within the shell, a plurality of superimposed communicating double frusto conical shaped baffle casings arranged upon said dome and gradually decreasing in size upwardly, an exhaust pipe communicating with the uppermost casing and extending downwardly in said shell, a plurality of double frusto conical shaped baffle casings interposed in said pipe, spaced from each other and arranged within the shell and a plurality of communicating double frusto conical shaped baffle casings connected to said pipe exteriorly of said shell, and a laterally extending cold air inlet pipe communicating with said shell above said closure.

3. A heater comprising a frusto cone-shaped shell, a closure for the lower end of the shell, a burner extending through said closure, a dome supported by the closure, surrounding said burner and arranged within the shell, a plurality of superimposed communicating double frusto-conical shaped baffle casings arranged upon said dome and gradually decreasing in size upwardly, an exhaust pipe communicating with the uppermost casing and extending downwardly in said shell, a plurality of double frusto conical shaped baffle casings interposed in said pipe, spaced from each other and arranged within the shell and a plurality of communicating double frusto conical shaped baffle casings connected to said pipe exteriorly of said shell, said baffle casings connected to said pipe within said casing arranged in relation with respect to the baffle casings supported by the dome and of less area than the baffle casings supported by the dome.

4. A heater comprising a frusto cone-shaped shell, a closure for the lower end of the shell, a burner extending through said closure, a dome supported by the closure, surrounding said burner and arranged within the shell, a plurality of superimposed communicating double frusto conical shaped baffle casings arranged upon said dome and gradually decreasing in size upwardly, an exhaust pipe communicating with the uppermost casing and extending downwardly in said shell, a plurality of double frusto conical shaped baffle casings interposed in said pipe, spaced from each other and arranged within the shell and a plurality of communicating double frusto conical shaped baffle casings connected to said pipe exteriorly of said shell, said baffle casings connected to said pipe within said casing arranged in relation with respect to the baffle casings supported by the dome and of less area than the baffle casings supported by the dome, said baffle casings connected to said pipe exteriorly of the shell of greater area than the baffle casings connected to said pipe and arranged within the shell.

5. A heater comprising a shell having a closed lower end, a burner extending in said heater, a dome arranged within the shell and surrounding a burner, a plurality of baffle casings communicating with said dome, an exhaust pipe communicating with one of said casings and extending out of said shell, a plurality of baffle casings carried by that portion of said pipe within said shell, and a cold air pipe communicating with said shell above said closure, said baffle casings carried by said exhaust pipe of less area than the baffle casings communicating with the dome.

6. A heater comprising a shell having a closed lower end, a burner extending in said heater, a dome arranged within the shell and surrounding a burner, a plurality of baffle casings communicating with said dome, an exhaust pipe communicating with one of said casings and extending out of said shell, a plurality of baffle casings carried by that portion of said pipe within said shell, and a cold air pipe communicating with said shell above said closure, said baffle casings carried by said exhaust pipe of less area than the baffle casings communicating with the dome, said baffle casings carried by said dome decreasing in size upwardly.

7. A heater comprising a shell, a burner extending therein, a closure for the lower end of the shell, a dome supported by the closure and surrounding the burner, a plurality of baffle casings gradually decreasing in size communicating with each other and arranged above and communicating with said dome, an exhaust pipe opening into one of said casings and extending through the side of said shell, baffle casings carried by that portion of the pipe within said shell and of less area than the baffle casings supported by the dome, baffle casings carried by said pipe exteriorly of said shell and of greater area than the baffle casings carried by the pipe within the shell, and a cold air pipe communicating with said shell above said closure.

In testimony whereof I affix my signature in the presence of two witnesses.

CASPER H. HENZEL.

Witnesses:
MAX H. SROLOVITZ,
K. H. BUTLER.